United States Patent Office

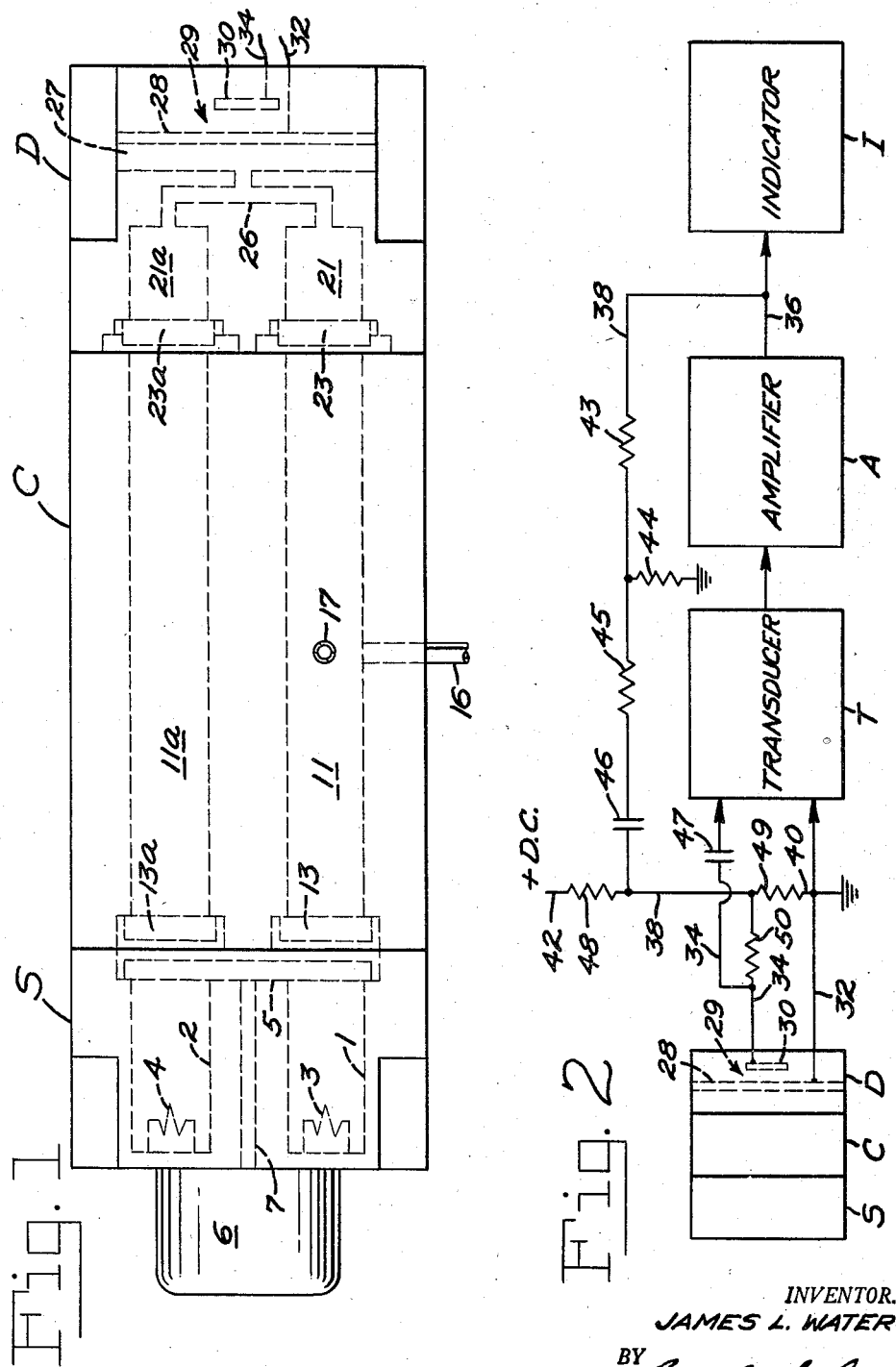
INVENTOR.
JAMES L. WATERS

2,876,357
Patented Mar. 3, 1959

2,876,357

MATERIAL ANALYSIS APPARATUS

James L. Waters, Framingham, Mass., assignor to Mine Safety Appliances Company, Pittsburgh, Pa., a corporation of Pennsylvania Application March 25, 1957, Serial No. 648,216

5 Claims. (Cl. 250—43.5)

This invention relates to material analysis apparatus wherein materials are subjected to measurement, and more particularly to a feedback means in such apparatus for stabilizing the means of measuring the materials.

In the analysis of materials by various known methods in which the constituents of the materials are determined by measurement of pressure changes due to thermal variations of the materials, it is desirable to stabilize the means for measuring the materials and other component parts where such means and parts vary with time and ambient conditions.

The invention is applicable to, and is herein illustrated as embodied in, gas analysis apparatus wherein infrared radiation is caused to travel along two paths and is caused to traverse a cell containing the gas to be analyzed in one of said paths, and wherein the gas in said analysis cell affects the relative intensity of the beams. The gas is ordinarily continuously passed through said analysis cell. An advantageous mode of analysis of this type is described in Patent No. 2,648,775 granted August 11, 1953.

An object of this invention is to provide a means for measuring with high accuracy thermal absorbing constituents of materials. Another object is to provide a feedback means for stabilizing the means of material constituent measurement which varies with time and ambient conditions. A still further object of this invention is to provide, in the infrared analysis of gases, a feedback means for stabilizing the output signal resulting from capacity changes of a measuring means produced by thermal variations in the body of gas being measured.

Other objects and advantages will become apparent from the following description and annexed drawings in which:

Fig. 1 is a top plan view of an infrared analyzer, and

Fig. 2 is a diagrammatic and schematic view of the complete apparatus.

Referring to Fig. 1, the analyzer shown herein is the same as disclosed in co-pending application Serial No. 648,045 filed March 25, 1957. The analyzer is shown as comprising three single block units S, C and D. Source unit S comprises passages 1 and 2 having arranged therein infrared sources 3 and 4, the beams from which, may be interrupted or alternated by the interrupter 5 rotatably actuated by motor 6 through motor shaft 7.

Cell unit C is connected to unit S in abutting relationship by suitable mechanical fastening means in a manner whereby the end surfaces of units S and C are in thermal contact with each other. Unit C provides a housing or block forming an analysis or sample gas chamber 11 and a comparison gas chamber 11a aligned with passages 1 and 2 of unit S. Chambers 11 and 11a extend throughout the length of unit C and are sealed at one end by windows 13 and 13a of infrared transmitting material, such as calcium fluoride. A convenient means for passing analysis gas through chamber 11 is provided, such as through conduits 16 and 17.

Detector unit D is secured to unit C in abutting relationship for thermal contact therewith by suitable fastening means, and provides a housing or block forming detector gas chambers 21 and 21a. Chambers 21 and 21a are aligned with chambers 11 and 11a, and are connected together, at the rear thereof by conduit means 26 leading into chamber 27 closed by a flexible membrane or condenser plate 28. A condenser microphone 29 comprises movable condenser plate 28, and a fixed condenser plate 30. Chambers 21 and 21a are sealed at the ends aligned with chambers 11 and 11a by windows 23 and 23a made from similar light transmitting materials as windows 13 and 13a. Chambers 21 and 21a are adapted to contain a detector gas to which plate 28 is responsive. Plate 28 may be made from thin metallic material, such as metal foil, and plate 30 is metallic. Thermal variations in the detector gas having at least one spectral absorption region in common with a spectral absorption region of the component for which analysis is to be made produces capacity changes or time varying changes which are measured by condenser microphone 29.

For the operation of the known infrared analyzer, such as here described and illustrated, reference may be had to Patent No. 2,648,775 and the copending application mentioned hereinabove. Briefly stated, the analyzer of this invention passes beams from infrared sources 3 and 4, alternately, through analysis gas chamber 11 and comparison gas chamber 11a into chambers 21, 21a and 27 containing a detector gas. The absorption of infrared radiation by the analysis gas is reflected in the detector gas chambers to vibrate or fluctuate plate 28 causing capacity changes in microphone 29 for measuring a component of the gas being analyzed.

The instant invention will now be described with particular reference to Fig. 2. The output of condenser microphone 29 is connected to a transducer T through output wire leads 32 and 34 connected to movable plate 28 and fixed plate 30, respectively. Transducer T, for example, could take the form of a tuned grid tuned plate oscillator, or if desired, could be chosen from other well known transducers, such as a tuned plate oscillator, FM modulator and discriminator or a heterodyning circuit with a beat-frequency oscillator. The output of the transducer T is connected to a conventional amplifier A, which in turn, has its output connected to an indicator I through wire lead 36. A portion of the amplifier output traversing lead 36 is fed back as negative feedback to and across the plates 28 and 30 of condenser microphone 29 by wire leads 38 and 40. A D. C. bias voltage is impressed across the condenser microphone plates 28 and 30; the plus side of the D. C. voltage being applied to plate 30 through leads 42, 38 and 34. Plate 28 is at ground potential through lead 32. Resistors 43, 44 and 45 attenuate the feedback signal. Condenser 46 prevents the D. C. voltage from being short circuited to ground through resistors 44 and 45. Similarly, condenser 47 prevents short circuiting of the D. C. voltage through the transducer T. Resistors 48 and 49 determine the D. C. voltage applied across plates 28 and 30. In the event that the microphone plates become accidentally shorted, resistor 50 will limit the current that would flow through the microphone. When a tuned grid tuned plate oscillator is used, it is desirable to employ a condenser microphone in the tuned grid circuit. Accordingly, when the microphone changes capacity, the oscillator frequency changes. Also, amplifier A may, for example, take the form of a conventional resistance capacitance coupled amplifier, and, if necessary, will include a phase shifting circuit so that the phase of the output signal can be properly adjusted; otherwise, the amplifier may be designed providing the proper phase.

In the operation of the embodiment illustrated, for example for the determination of carbon dioxide ($CO_2$) content of a gas, the analysis gas containing the unknown quantity of $CO_2$ may be placed in the analysis gas chamber 11. A comparison gas, for example nitrogen free from $CO_2$ may be placed in comparison gas chamber 11a. Detector gas chambers 21, 21a and 27 may be filled with $CO_2$, which of course has the same spectral absorption as the constituent to be determined.

Infrared radiation from sources 3 and 4 is transmitted in beams of substantially equal intensity through passages 1 and 2 respectively, and through the nitrogen in comparison chamber 11a, and the analysis gas containing the unknown quantity of $CO_2$ in analysis gas chamber 11, respectively.

By rotating the interrupter 5 at 10 cycles per second, the beams passing through the comparison gas, and the analysis gas, respectively, will be separately and alternately projected into the confined $CO_2$ in the detector gas chambers 21, 21a and 27. No radiation will be absorbed by the nitrogen from the beam passing through the comparison gas chamber 11a in the spectral absorption regions corresponding to $CO_2$, but so far as the beam passing through analysis gas chamber 11 is concerned, radiation in the $CO_2$ spectral absorption regions will be absorbed in accordance with the concentration of $CO_2$ in the analysis gas.

The $CO_2$ in the detector chambers 21, 21a and 27 will absorb from each beam substantially all the remaining radiation in the spectral absorption regions corresponding to $CO_2$. The heating effect of each separate and alternate beam on the body of confined $CO_2$ in the detector chambers will differ, however, by reason of the above-mentioned absorption in the analysis gas chamber 11. There will be 10 separate measurements of this difference per second.

The thermal variations in the $CO_2$ in the detector chambers occur at the frequency of alternation, in this instance 10 cycles per second, and are caused by the difference in radiation, in the spectral absorption regions corresponding to $CO_2$, absorbed by the body of confined $CO_2$ in the detector chambers from the two beams. These thermal variations, such as volume and pressure variations, may be referred to as time varying forces, produce time varying capacity changes in the condenser microphone 29. These pressure variations or time varying forces produce a pulsating pressure signal acting on plate 28 to cause the plate to vibrate or fluctuate, and are forces which are relatively constant over the dimensions in which plate 28 moves. As plate 28 vibrates, it changes a property of the transducer T in such a way that the output of the transducer produces an A. C. electrical signal of the same frequency as the frequency of plate vibration, and the amplitude of the signal is proportional to the amplitude of plate vibrations. This A. C. output signal is amplified by amplifier A and conducted through wire lead 36 to indicator I where the amplitude of the signal is indicated. Thus, the amplitude indicated at indicator I is proportional to the amount of vibration of plate 28 or the pressure variation in the detector gas chambers 21, 21a and 27.

Since analyzers of the type described herein are susceptible to instability due to changes in tension of flexible plate 28, changes in the sensitivity of the transducer T resulting from variations in the components thereof, and changes in the gain of amplifier A, a negative feedback means is employed to improve the stability of the analyzer. Briefly defined, the negative feedback comprises feeding back a portion of the amplifier A output voltage or signal to and across the condenser microphone 29 to produce a force in opposition to the input forces on the microphone.

Referring now to the details of the feedback circuit, plate 28 is polarized by the D. C. voltage across plates 28 and 30 to attract the two plates together. A portion of the A. C. signal, taken off of wire lead 36 from the output of amplifier A and conducted through lead 38 across plates 28 and 30, produces greater or less attraction on plate 28 to impede the effects from the pressure variations of the detector gas on plate 28. Amplifier A adjusts the phase of its output signal in a manner whereby the feedback increases or decreases the D. C. attraction on plates 28 and 30. Thusly, the motion of plate 28 is opposed at all times providing stability for the analyzer by continuously correcting variations in the tension of plate 28, changes in sensitivity of transducer T and changes in gain of amplifier A. In accordance with this invention, it is possible, with the feedback means, to greatly increase stability of an analyzer over longer periods of time for the measurement of small pressure changes and to materially decrease inaccuracies due to analyzer variations.

It is to be clearly understood that this invention is not limited to infrared analyzers, but includes other devices in which input forces act upon a condenser microphone for measuring such forces and having means for stabilizing such measurement.

Having explained the principle of the present invention and having illustrated and described what is considered to be several of the best embodiments, it is to be understood that, within the scope of the appended claims, the invention may be practiced otherwise than as specifically illustrated and described.

I claim:

1. A device for measurement of time varying forces comprising a condenser microphone having a movable condenser plate and a fixed condenser plate, said movable plate moving in response to said time varying forces to produce time varying capacity changes, means for converting said changes to a time varying output voltage, means for indicating said voltage, means for applying a D. C. bias voltage across said plates, and means for applying at least a portion of said output voltage across said plates to reduce movement of said movable plate.

2. A device for measurement of time varying forces comprising a condenser microphone having a movable condenser plate and a fixed condenser plate, said movable plate moving in response to said time varying forces to produce time varying capacity changes, means for converting said changes to a time varying A. C. output signal, means for indicating said signal, means for applying a D. C. bias voltage across said plates, and means for applying at least a portion of said output signal across said plates to reduce movement of said movable plate.

3. In an analyzer for the analysis of materials in which pressure changes indicate the composition of said materials, comprising a condenser microphone having a movable condenser plate and a fixed condenser plate, said movable plate moving in response to said pressure changes to produce capacity changes in said condenser microphone, means for converting said capacity changes to a time varying A. C. output signal, means for indicating said output signal, means for applying a D. C. bias voltage across said plates, and means for applying at least a portion of said output signal across said plates to reduce movement of said movable plate.

4. In an infrared analyzer for the analysis of materials having a detector means for producing pressure changes in response to thermal variations in the analysis material, the improvement comprising a condenser microphone in said detector means and having a movable condenser plate and a fixed condenser plate, said movable plate moving in response to said pressure changes to produce capacity changes in said condenser microphone, means for converting said capacity changes to a time varying A. C. output signal, means for indicating said output signal, means for applying a D. C. bias voltage across said plates, and means for applying at least a portion of said output signal across said plates to reduce movement of said movable plate.

5. In an infrared analyzer for the analysis of materials having a detector means for producing pressure changes in response to thermal variations in the analysis material, the improvement comprising a condenser microphone in said detector means and having a movable condenser plate and a fixed condenser plate, said movable plate moving in response to said pressure changes to produce capacity changes in said condenser microphone, means for converting said capacity changes to output changes of electrical potential, means for indicating said output changes, means for applying a D. C. bias voltage across said plates, and means for applying at least a portion of said output changes across said plates to reduce movement of said movable plate.

References Cited in the file of this patent
FOREIGN PATENTS

| | | |
|---|---|---|
| 2,709,751 | Meyer | May 31, 1955 |
| 2,750,834 | Golay | June 19, 1956 |
| 2,758,215 | Skarstrom | Aug. 7, 1956 |